(12) United States Patent
Durand et al.

(10) Patent No.: US 9,199,719 B2
(45) Date of Patent: Dec. 1, 2015

(54) KEEL BEAM OF AN AIRCRAFT

(71) Applicant: AIRBUS OPERATIONS (S.A.S), Toulouse (FR)

(72) Inventors: Yves Durand, Aussonne (FR); Denis Soula, Toulouse (FR); Jérôme Colmagro, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 260 days.

(21) Appl. No.: 13/888,952

(22) Filed: May 7, 2013

(65) Prior Publication Data

US 2013/0299636 A1  Nov. 14, 2013

(30) Foreign Application Priority Data

May 9, 2012 (FR) ..................... 12 54203

(51) Int. Cl.
- *B64C 3/00* (2006.01)
- *B64C 3/18* (2006.01)
- *B64C 1/06* (2006.01)
- *B64C 1/26* (2006.01)

(52) U.S. Cl.
CPC .............. *B64C 3/185* (2013.01); *B64C 1/065* (2013.01); *B64C 1/26* (2013.01)

(58) Field of Classification Search
CPC ............ B64C 3/185; B64C 1/26; B64C 1/065
See application file for complete search history.

(56) References Cited

U.S. PATENT DOCUMENTS

| | | | | |
|---|---|---|---|---|
| 1,527,728 A * | 2/1925 | Arnstein | ................ | 296/204 |
| 4,635,882 A | 1/1987 | SenGupta | | |
| 7,810,756 B2 * | 10/2010 | Alby et al. | ................ | 244/119 |
| 8,025,253 B2 * | 9/2011 | Sprenger | ................ | 244/121 |
| 8,317,133 B2 * | 11/2012 | Nolla | ................ | 244/119 |
| 2008/0156935 A1 | 7/2008 | Alby | | |
| 2010/0170987 A1 * | 7/2010 | Meyer | ................ | 244/120 |
| 2011/0233335 A1 * | 9/2011 | Vinue Santolalla et al. | .. | 244/119 |

FOREIGN PATENT DOCUMENTS

| | | |
|---|---|---|
| FR | 2 901 240 | 11/2007 |
| FR | 2 936 489 | 4/2010 |
| FR | 2 943 944 | 10/2010 |

OTHER PUBLICATIONS

Niu, Michael Chun-Yung (1999). Airframe Structural Design—Practical Design Information and Data on Aircraft Structures (2nd Edition). (pp. 406-412). AD Adaso/Adastra Engineering LLC. Online version available at:http://www.knovel.com/web/portal/browse/display?_EXT_KNOVEL_DISPLAY_bookid=4695 &VerticalID=0.*
French Search Report dated Jan. 18, 2013.

* cited by examiner

*Primary Examiner* — Brian M O'Hara
*Assistant Examiner* — Michael Kreiner
(74) *Attorney, Agent, or Firm* — Dickinson Wright PLLC

(57) ABSTRACT

A keel beam connected to a central wing box of an aircraft and ensuring the connection between a front structure and a rear structure of an aircraft is characterized in that it includes, on the one hand, a U-shaped body with a horizontal base and two solid lateral walls, and on the other hand, a cover which has a U shape oriented in the same manner as the body, with a base in the lower portion and curved edges, the ends of which are oriented upward so that each curved edge includes an outer surface flattened against and fixed to the inner surface of the lateral walls in order to define, with the body, a closed section, the cover including openings for accessing the inside of the keel beam.

9 Claims, 4 Drawing Sheets

KEEL BEAM OF AN AIRCRAFT

CROSS REFERENCE TO RELATED APPLICATION

This application is entitled to and claims the benefit of French Application No. FR 12 54203 filed May 9, 2012, the disclosure of which, including the specification, claims, drawings and abstract, is incorporated herein by reference in its entirety.

FIELD

The present invention relates to a keel beam of an aircraft.

BACKGROUND

FIG. 1 shows a schematic view of a fuselage 10 of an aircraft with a central wing box 12 providing the connection between the fuselage and the wings and a landing gear casing 14. For the remainder of the description, longitudinal direction is to be understood as the direction corresponding to the greatest dimension of the fuselage. A transverse plane is a plane that is perpendicular to the longitudinal direction. The front of the aircraft corresponds to the nose of the fuselage and the rear corresponds to the tail unit.

On both sides of the central wing box 12 and/or of the landing gear casing 14, the fuselage 10 comprises a first section 16 arranged at the front and a second section 18 arranged at the rear, the two sections 16 and 18 being connected by a keel beam 20 arranged under the central wing box 12.

According to an embodiment shown in FIG. 2, a keel beam 20 is metallic and has a section substantially rectangular with an upper panel 22.1, a lower panel 22.2, two lateral panels 22.3 and 22.4 connected by angle plates 24 at each angle.

To enable this assembly, the laterals panels 22.3 and 22.4 have openings 26 to enable access to the fastenings located inside the beam.

The fact that the lateral panels have openings necessarily impacts the strength of the beam, which makes it necessary to increase the size of its section for taking up forces.

Alternatively, the elements of the beam are made of composite material. Even if this solution makes it possible to reduce the onboard mass, it does not optimize it considering the geometry of the elements constituting the beam.

According to another drawback, the free edges of the panels forming the beam, particularly those provided in the area of the lower angles, are exposed to the path of tire or rim debris when the landing gear is out. In the case of the panels from composite material, an impact in the area of the side of the panel can have substantial consequences on the mechanical characteristics of the panel.

According to another drawback, the keel beam and the central wing box are connected by means of splice plates which do not allow any slight deformation around an axis, parallel to the longitudinal direction. The rigidity of the connection between the central wing box and the keel beam causes the stresses in the area of the keel beam caused by the flexion forces of the wings to be increased.

SUMMARY

The present invention aims at overcoming the drawbacks of the prior art.

According to a first object, the invention proposes a particular design of the keel beam allowing the onboard mass to be optimized and the risks of damage to be reduced.

To this end, the object of the invention is a keel beam which is characterized in that it comprises, on the one hand, a U-shaped body with a horizontal base and two solid lateral walls (without openings), and on the other hand, a U-shaped cover oriented in the same manner as the body, with a base in the lower part and curved edges whose ends are oriented upward so that each curved edge comprises an outer surface flattened against and fixed to the inner surface of the ends of the lateral walls of the U-shaped body in order to define, with the body, a closed section, said cover comprising openings for accessing the inside of the keel beam.

Therefore, according to the invention, there is no free edge in the area of the lower angles of the keel beam, which tends to improve the strength of the beam vis-a-vis possible tire or rim debris. In addition, it is possible to optimize the sizing of the beam by eliminating the openings in the area of the lateral walls and by creating openings in the area of the cover.

Preferably, the lateral walls are flared.

According to another object, the invention aims at improving the connection between the keel beam and the central wing box in order to allow slight deformations around axes, parallel to the longitudinal direction.

To this end, the keel beam comprises two anchoring points arranged on both sides of said beam to connect the keel beam to the central wing box, each anchoring point comprising at least one metallic splice plate with a first portion comprising means of connection with the lateral wall of the body of the keel beam and a second portion outward of the beam providing a support surface for the lower panel of the central wing box and which is connected to the lower panel of the central wing box by connection means, the two portions being connected by an area of curvature adapted to be deformed.

BRIEF DESCRIPTION OF DRAWINGS

Other characteristics and advantages will become apparent from the description that follows, the description being given only by way of example, with reference to the annexed drawings, wherein.

DETAILED DESCRIPTION

Figure 1:
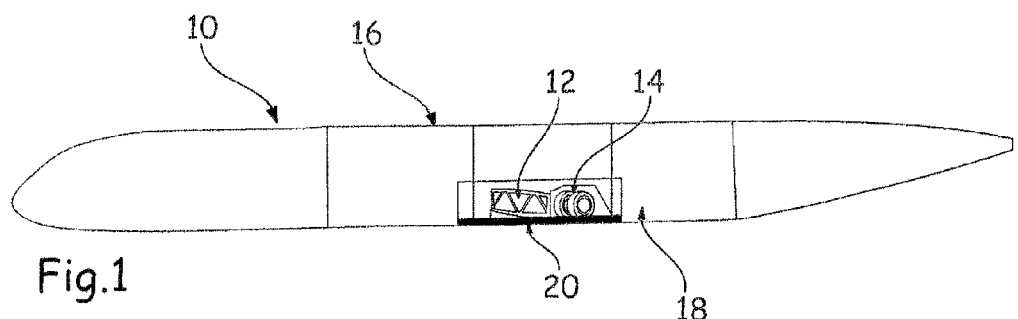
FIG. 1 is a schematic view of a fuselage according to the prior art.
Figure 2:
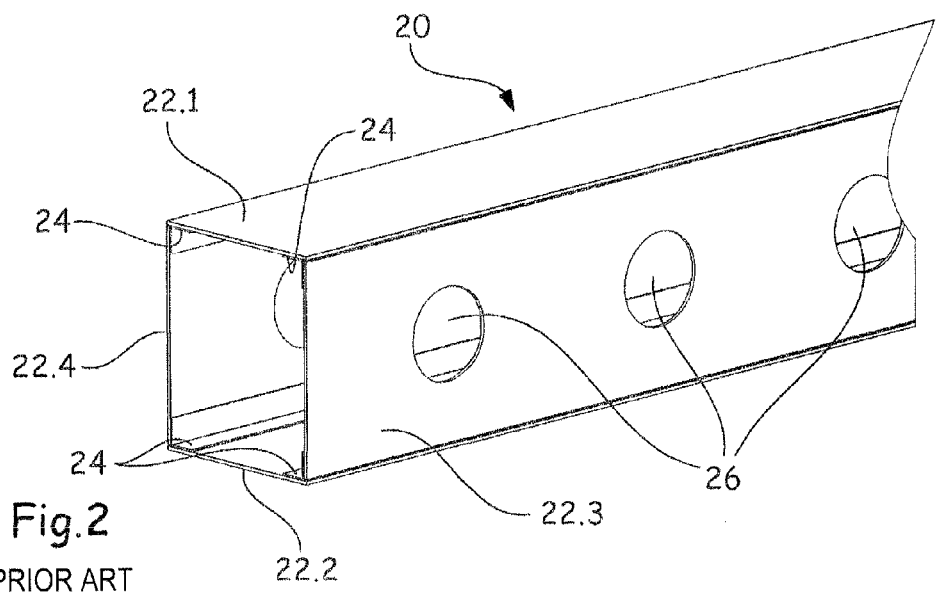
FIG. 2 is a schematic view showing, in perspective, a keel beam according to the prior art.
Figure 3:
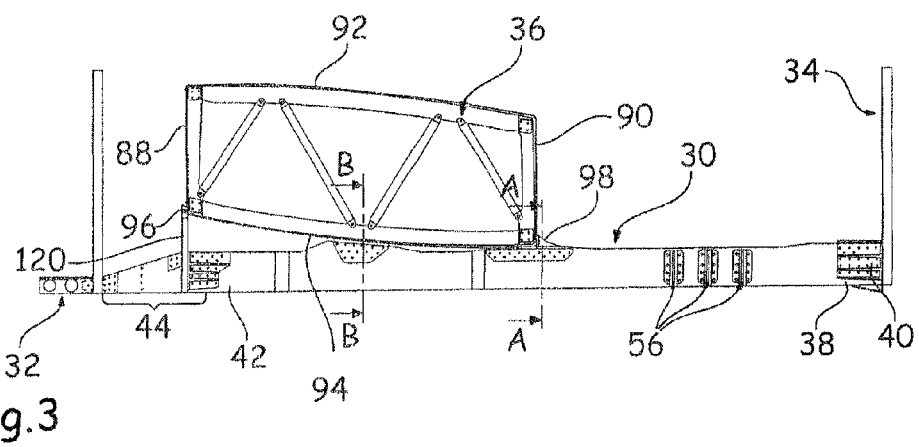
FIG. 3 is a lateral view of a keel beam according to the invention.
Figure 4:
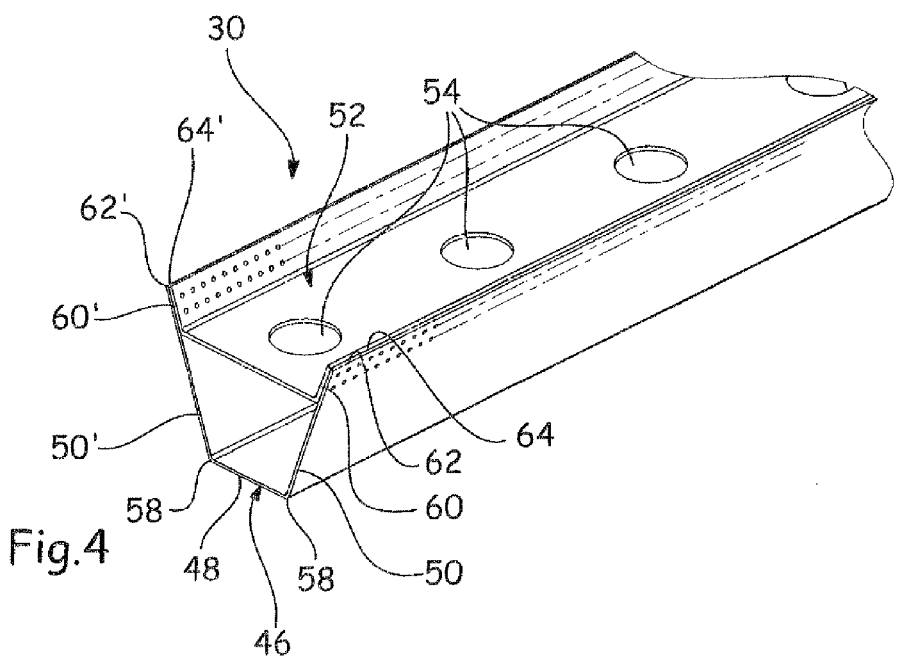
FIG. 4 is a schematic view of a keel beam according to the invention without reinforcement and without splice plate.
Figure 5:
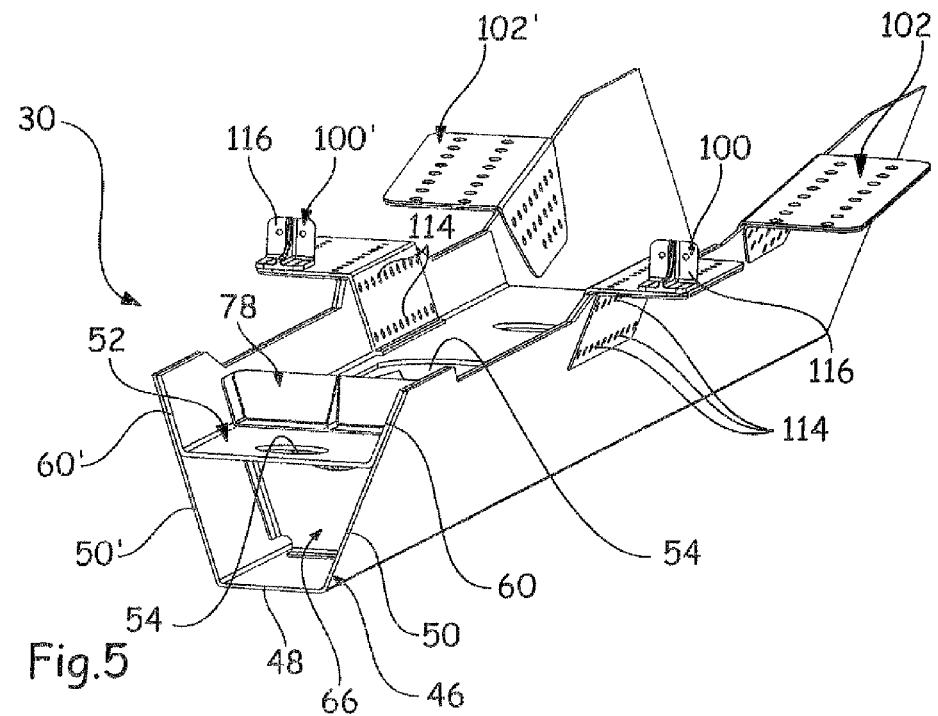
FIG. 5 is a perspective view of a keel beam according to the invention with reinforcements and splice plates.

FIG. 3 shows a keel beam 30 of an aircraft for connecting a front structure 32 and a rear structure 34 of an aircraft. The keel beam 30 is also connected to a central wing box 36. The keel beam 30 comprises a rear end 38 connected by means of splice plates 40 to the rear structure 34 and a front end 42 connected by means of an assembly of reinforcements and splice plates 44 to the front stricture 32.

The keel beam 30 is made of composite material to reduce the onboard mass. Alternatively, it may be metallic and obtained by bending, extrusion, pressure forming, explosion forming.

According to the invention, the keel beam 30 comprises, on the one hand, a first U-shaped portion 46, later referred to as a body, with a horizontal base 48 and two lateral solid walls 50, 50', and on the other hand, a second portion 52 referred to as a cover which defines, with the body 46, a closed section and which comprises openings 54 for accessing the inside of the keel beam 30. Different elements such as anchoring points, brackets for bearings of door of landing gear casing 56, splice plates, are affixed to the keel beam by fasteners.

By "solid" it is to be understood that the lateral walls have no cutout in the same manner as the cover for allowing access to the inside of the beam.

Contrary to the prior art, the access to the inside of the beam, particularly to make the fasteners accessible, is not created by openings housed in the area of the lateral walls. Therefore, it is possible to optimize the sizing of the beam by eliminating the openings in the area of the lateral walls and by creating openings in the area of the cover 52. Hence, the lateral walls 50, 50' of the body 46 do the work.

Advantageously, the lateral walls 50, 50' are flared, the dimension between the lateral walls increasing in a direction away from the base 48. Therefore, the body presents a trough-shaped transverse section. By "trough", it is to be understood that the body has a transverse cross-section in the shape of an isosceles trapezoid, the shorter base being arranged in the lower portion, the upper base being open.

This configuration allows the forces to be better taken up by the keel beam.

"According to another advantage of the invention, the base 48 and the lateral walls 50, 50' are made in one piece which comprises, in the area of the junction zones, rounded shapes 58. Therefore, contrary to the prior art, there is no free edge in the area of the lower angles of the keel beam, which tends to improve the strength of the beam vis-a-vis possible tire or rim debris."

According to another characteristic of the invention, the U-shaped cover 52 is oriented in the same manner as the body 46, namely, a base in the lower portion and curved edges 60, 60' whose ends are oriented upward so that each curved edge comprises an outer surface flattened against and fixed to the lower surface of the ends of the lateral walls 50, 50'. According to this configuration, the two ends of the fasteners used to affix the body and the cover are accessible from the outside of the keel beam 30. Advantageously, the sides 62, 62' of the lateral walls are arranged along the extension, respectively, of the sides 64, 64' of the curved edges 60, 60'.

Different embodiments can be envisioned to make the body 46 and the cover 52 from composite material.

The shapes of the cover and body allow, for each, a very simple embodiment by molding on a male mold.

Therefore, according to an embodiment, first, fiber layers are arranged on a male mold. After all the layers have been set in place, a flexible mold, referred to as a "caul-plate", is attached.

According to this method, the two surfaces of the body are smooth, the first being in contact with the male mold, the other with the flexible mold.

According to a first alternative, dry fiber layers can be used to obtain a dry preform which is thus resin-impregnated, then polymerized.

According to another alternative, fiber layers pre-impregnated with a thermosetting resin can be used, the preform being subsequently polymerized.

According to another alternative, fiber layers pre-impregnated with thermoplastic resin can be used, the preform being subsequently consolidated.

Preferably, the beam comprises inner reinforcements 66 arranged between the body 46 and the cover 52. Each inner reinforcement 66 comprises a plate 68 arranged along a transverse plane, with two edges connected to the lateral walls 50, 50' of the body 46. This solution makes it possible to guarantee the spacing of the lateral walls from the keel beam and improve the stability of the latter.

Figure 7:
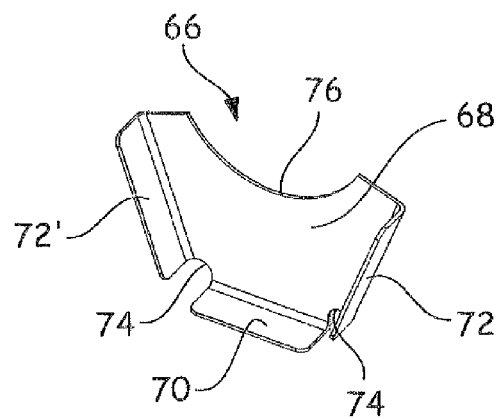
FIG. 7 is a perspective view of a first reinforcement according to the invention.

According to an embodiment shown in FIG. 7, the plate 68 comprises, in the area of three sides, edges curved at 90° with respect to the plate 68, a first curved edge 70, one of the surfaces of which is flattened against and fixed to the base 48 of the body 46, a second curved edge 72, one of the surfaces of which is flattened against and fixed to one of the lateral walls 50 of the body and a third curved edge 72', one of the surfaces of which is flattened against and fixed to the other lateral wall 50'.

The curved edges 70, 72, 72' are fixed to the body 46 by any appropriate means.

Preferably, the plate 68 comprises, in the area of its lower angles, cutouts 74 to make it possible to bend the curved edges 70, 72, 72'.

Advantageously, the plate 68 comprises, in the area of its upper edge, a cutout 76 with a large radius of curvature. This configuration makes it possible to increase the possibility of flexion deformation along the longitudinal axis of the beam.

According to an embodiment, the keel beam 30 comprises at least one outer reinforcement 78 arranged outside the closed section of the beam and connecting the lateral walls 50 and 50' of the body.

Figure 8:
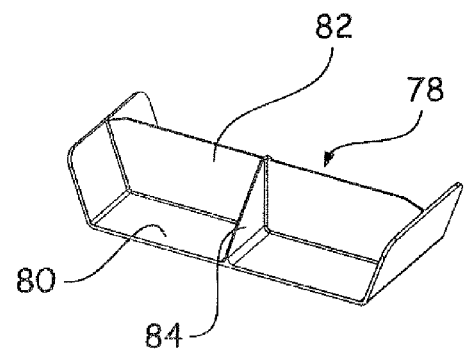
FIG. 8 is a perspective view of a second reinforcement according to the invention.

As shown in FIG. 8, the outer reinforcement 78 comprises a U-shaped strip 80 which is flattened against and fixed to the upper surface of the cover 52, a first rib 82 arranged along a transverse plane connected to the base and to the branches of the U, as well as a second rib 84 perpendicular to the base of the U and to the first rib 82, equidistant from the branches of the U.

According to another characteristic, the keel beam 30 comprises a connection with the central wing box 36 which allows slight deformations around axes parallel to the longitudinal direction.

According to an embodiment shown in FIG. 3, a central wing box 36 comprises a front panel 88 perpendicular to the longitudinal direction, a rear panel 90, perpendicular to the longitudinal direction, an upper panel 92 and a lower panel 94 oriented toward the keel beam. In a longitudinal and vertical plane, the lower edge 94 is curved and its front edge 96 is higher than its rear edge 98.

The connection between the keel beam and the central wing box comprises two first anchoring points 100, 100' on both sides of said keel beam in the area of the rear edge 98 and two second anchoring points 102, 102' on both sides of said keel beam in the area of a median zone of the lower panel 94 (the median zone being approximately equidistant from the front edge 96 and rear edge 98).

The anchoring points 100, 100' are symmetrical with respect to a longitudinal median plane PM of the keel beam. Insofar as they are symmetrical, only the anchoring point 100 is described.

Figure 6A:
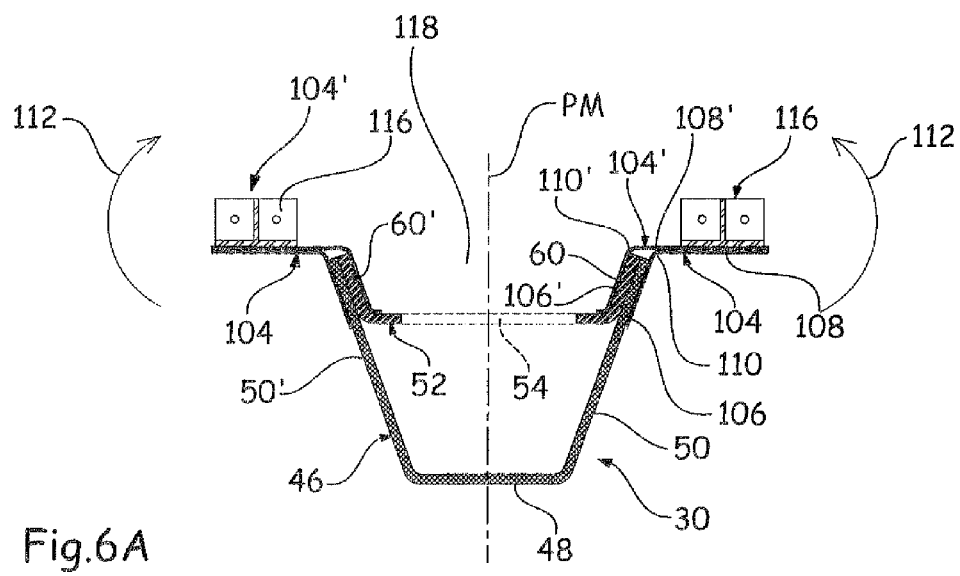
FIG. 6A is a cross-sectional view along the transverse plane AA of FIG. 3.

As shown in FIG. 6A, the anchoring point 100 comprises at least one metal splice plate 104 with a first portion 106 which comprises means of connection with the upper portion of the lateral wall 50 of the body 46 of the keel beam and a second portion 108 oriented outward of the beam which offers a support surface for the lower panel 94 of the central wing box and which is connected to the lower panel 94 by connection means. The two portions 106 and 108 are connected by a zone of curvature 110 which is adapted to deform around an axis, parallel to the longitudinal direction, as indicated schematically with the arrows 112 in order to facilitate the flexion of the wings. The splice plates are made of metal to obtain an elastic limit that is higher than a composite material.

Preferably, the anchoring point 100 comprises two splice plates 104, 104' flattened against one another in the area of the second portions 108, 108' and whose first portions 106, 106' are arranged on both sides of the upper portion of the lateral wall 50 of the body or of the upper portion of the lateral wall 50 of the body and of the curved edge 60 of the cover. Thus, in the area of the first portions 106 and 106', the splice plates 104, 104' encircle the upper portion of the lateral wall 50 of the body or the upper portion of the lateral portion 50 of the body and the curved edge 60 of the cover. Fasteners 114 are provided to ensure the connection between the keel beam 30 and the splice plates 104, 104'. These fasteners 114 run through the splice plates 104, 104', the lateral wall 50 and the curved edge 60 of the cover.

Figure 6B:
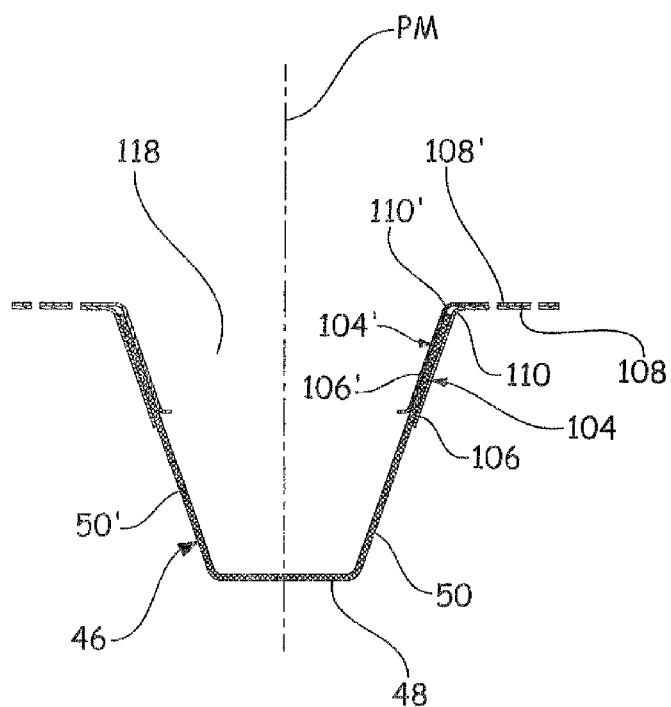
FIG. 6B is a cross-sectional view along the transverse plane BB of FIG. 3.

As shown in FIG. 6B, the anchoring points 102 and 102' are symmetrical with respect to the longitudinal median plane PM of the keel beam and are designed in the same manner as the anchoring points 100 and 100'.

In the absence of the cover in their area, the splice plates 104 and 104' of the anchoring points 102 and 102' encircle only the lateral wall 50 or 50' of the body.

As shown in FIG. 6A, the anchoring points 100 and 100' each comprise a corner bracket 116 against which the rear panel 90 of the central wing box can take support.

According to another advantage of the invention, the keel beam 30 comprises a recess 118 between the anchoring points 100 and 100' or 102 and 102' which facilitates the flexion of the wings.

Figure 9:
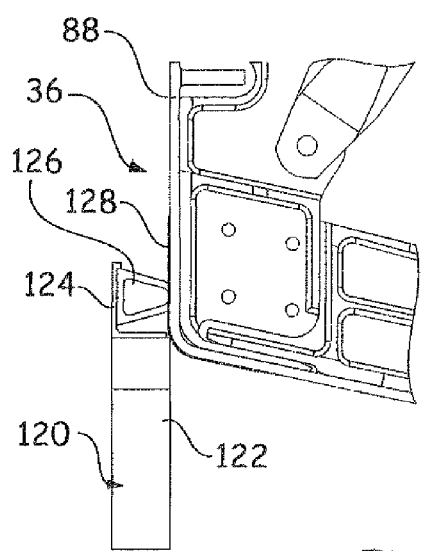
FIG. 9 is a detailed view of a contact zone between a central wing box and a frame affixed to the keel beam.

According to another aspect of the invention, the front end 42 of the keel beam 30 is connected by means of splice plates 44 to a frame 120 referred to as a front half-moon frame. According to an embodiment shown in FIG. 9, the front half-moon frame 120 comprises a wall 122 arranged along a transverse plane, at the front of the front panel 88 of the central wing box. The upper edge 124 of the wall 122 comprises, in the area of the surface oriented toward the central wing box, a sealing joint 126 in contact with the front panel 88 of the central wing box. During the flexion of the wings, the sealing joint 126 rubs against a foil 128 glued against the outer surface of the front panel 88.

The invention claimed is:

1. A keel beam for being connected to a central wing box of an aircraft and ensuring the connection between a front structure and a rear structure of the aircraft, said keel beam comprising:
   a U-shaped body having a horizontal base and two solid lateral walls, and
   a cover in a shape of a U oriented in a same manner as the body, said cover comprising a base in a lower portion and curved edges whose ends are oriented upward so that each curved edge comprises an outer surface flattened against or fixed to an inner surface of the lateral walls in order to define, with the body, a closed section, said cover comprising openings for accessing an inside of the keel beam.

2. The keel beam according to claim 1, wherein the lateral walls are flared, and a dimension between the lateral walls increases in a direction away from the horizontal base.

3. The keel beam according to claim 1, further comprising two anchoring points arranged on both sides of said beam to connect said beam to the central wing box.

4. The keel beam according to claim 3, wherein each said anchoring point comprises at least one metal splice plate with a first portion which comprises means of connection with a lateral wall of the body of the keel beam and a second portion oriented outward of the beam which offer a support surface for a lower panel of the central wing box and which is connected to the lower panel by connection means, the first and second portions being connected by a zone of curvature adapted to be deformed.

5. The keel beam according to claim 4, wherein each said anchoring point comprises two splice plates flattened against one another in the area of the second portions and whose first portions are arranged on both sides of the upper portion of the lateral portion of the body or of the upper portion of the lateral wall of the body and of the cover.

6. The keel beam according to claim 3, wherein the anchoring points are symmetrical with respect to a longitudinal median plane of the keel beam.

7. The keel beam according to claim 1, wherein the beam comprises inner reinforcements arranged between the body and the cover, each of them comprising a plate arranged along a transverse plane with two edges connected to the lateral walls of the body.

8. The keel beam according to claim 7, wherein the plate comprises in the area of an upper edge thereof, a cutout with a large radius of curvature.

9. The keel beam according to claim 1, further comprising at least one outer reinforcement arranged outside the closed section of the beam and connecting the lateral walls of the body.

* * * * *